Sept. 6, 1955 E. L. MATHER ET AL 2,717,357

VARIABLE ELECTRIC IMPEDANCE

Filed March 2, 1953 2 Sheets-Sheet 1

Inventors
E. L. Mather
R. J. Cheetham
By
Webb Mackey & Burden
Attorney

Inventors
E.L. Mather
R.J. Cheetham
By
Webb, Mackey & Burden
Attorney 2,717,357

VARIABLE ELECTRIC IMPEDANCE

Edward Lewis Mather, Liverpool, and Reginald James Cheetham, Prescot, England, assignors to British Insulated Callender's Cables Limited, London, England, a British company Application March 2, 1953, Serial No. 339,714

Claims priority, application Great Britain March 10, 1952

7 Claims. (Cl. 323—77)

This invention relates to an arrangement of resistors and capacitors for maintaining a desired relation between the resistive and reactive components of the impedance of a variable resistor and in particular for providing a variable resistor which, while possessing inductance, is so compensated that it behaves as a pure resistance throughout the range of adjustment. The arrangement is particularly suitable for use where fine and accurate adjustment of the value of resistance is required over a range which is a small proportion of the maximum value of the resistance.

Diagrammatically the arrangement in accordance with the invention is a two terminal impedance network comprising a line leading from the two terminals to a fixed non-inductive resistor with a variable inductive resistor inserted in one side of the line and with variable capacitors across the line on each side of the variable resistor, the adjustments of the variable elements being coupled for simultaneous and related movements.

When dealing with the particular condition that the inductive resistor behaves as a pure resistance, the maximum values of both the resistive and reactive components of the variable resistor are much less than the value of the fixed resistor and the arrangement is designed so as to provide that the resistance, inductive reactance and capacitative reactances vary together and in accordance with the same law in such a way that at all adjustments the relation $$R=\sqrt{\frac{L}{2C}}$$

is substantially maintained; R being the value of the fixed non-inductive resistor; L being the value of the inductance of the variable resistor and C the value of the capacitance of each of the two capacitors.

It is not necessary that $C_1$ and $C_2$ should be exactly equal, there may, for example, be a variation of rather more than 1%. When this is the case R is kept substantially equal to $$\sqrt{\frac{L}{C_1+C_2}}$$

in which $C_1$ and $C_2$ are the values of the capacitance of the two capacitors.

Structurally the arrangement comprises a variable resistance in the form of a straight wire or strip along which a moving contact on a slide is made to move. This slide is mechanically coupled to the two capacitors so that, in its movement, it adjusts the value of these as well as the value of the resistance and its associated inductance. An actuating member engages the slide so as to provide for the manipulation of it.

The variable capacitors may be formed by means of two fixed metal plates mounted side by side on an insulating support, one connected to the slide of the variable resistor and the other to the operative fixed terminal thereof. Adjacent to these two plates is a third plate symmetrically placed relative to them so as to co-operate with them in forming capacitors with air or other dielectric. This third plate is movable with the slide and is connected to the side of the line opposite to that in which the variable resistor is connected.

With such an arrangement the changes of values of resistance, inductance and capacitance which take place as the slide is manipulated can readily be made to maintain a desired relation to each other and follow the same law; for instance they may be linear.

The construction of a variable resistor arrangement in accordance with the invention will hereinafter be described as an example with reference to the accompanying drawings in which.

Figure 1:
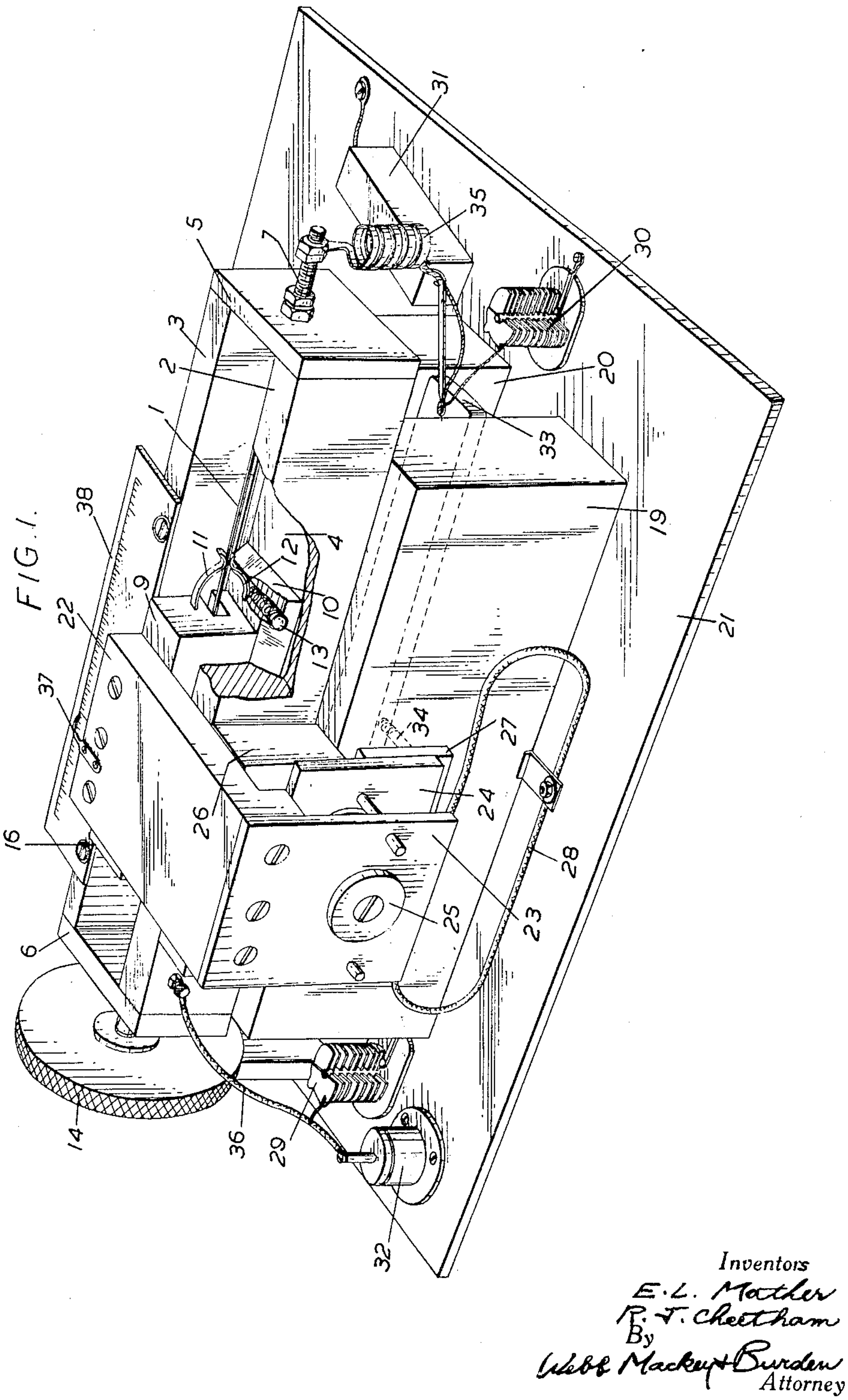
Figure 1 is a perspective view of the arrangement.
Figure 4:
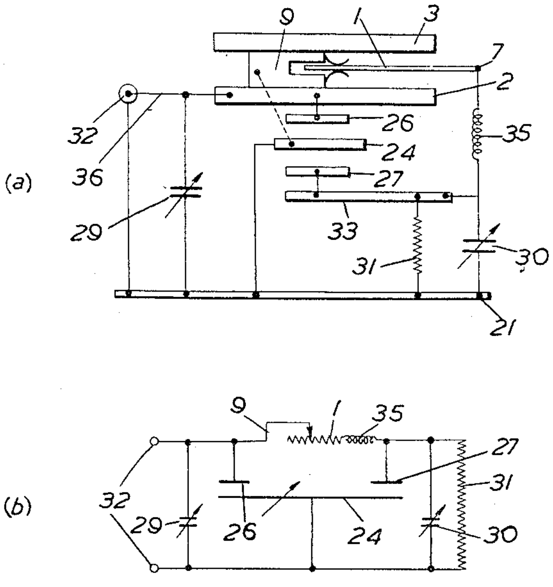

Figures 4 (*a*) and (*b*) are diagrammatic representations of the electrical connections between the various elements of the arrangement shown in Figure 1.

Figure 2:
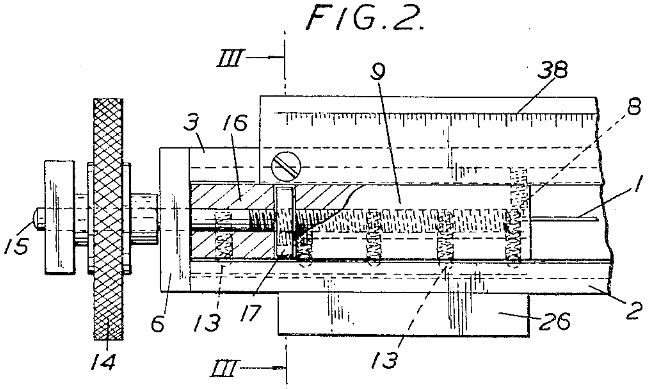
Figure 2 is a plan of part of the apparatus shown in Figure 1.
Figure 3:
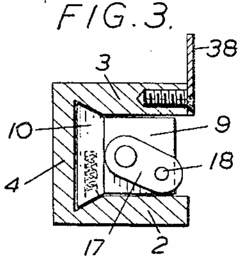
Figure 3 is a cross-section on the line III–III in Figure 2.

Referring to Figures 1 to 3, the variable resistor is in the form of a fine metal strip 1 mounted to lie centrally along part of the length of a box shaped enclosure the sides and bottom of which are brass plates 2, 3 and 4 and the ends of which are insulating blocks 5 and 6. One end of the wire is supported by a terminal 7 passing through the centre of the insulating block 5 the other end is supported by a lug 8 (Figure 2) projecting horizontally from the side plate 3.

The slide for the variable resistor comprises a brass block 9 rigidly mounted on a brass plate 10 of trapezoidal cross-section, the blocks 9 and 10 carrying two spring blades 11 and 12 which make contact with the resistance strip 1. The lower parts of the side plates 2 and 3 are recessed to fit the lower plate 10 of the slide and the plate 10 is pressed into contact with the side plate 3 by means of a number of spring loaded ball bearings 13, one only of which may be seen in Figure 1, making contact with the side plate 2.

The slide can be moved backwards and forwards along the box shaped enclosure by the rotation of a thumb wheel 14 rigidly mounted on a threaded spindle 15 which passes axially through plain bores in the block 9 and in a second block 16 which is also rigidly mounted on the plate 10. The slide is driven from the spindle 15 by a threaded nut 17 running on the spindle 15 and located between the blocks 9 and 16. The nut 17 is prevented from rotating by a pin 18 (Figure 3) which projects into a hole drilled in the block 9. This form of coupling allows for lateral movement of the slide with respect to the box shaped enclosure under the action of the spring loaded balls 13.

The box shaped enclosure is mounted on two insulating blocks 19 and 20 which are rigidly supported on a metal base plate 21 for the whole apparatus.

The slide also carries a moving plate for two variable capacitors in the following way. An insulating block 22 is secured to the slide by threaded pins which pass into the brass blocks 9 and 16. On the free end of this block there is rigidly mounted an insulating plate 23 on which the moving plate 24 of the two capacitors is adjustably mounted. Adjustment of the plate is effected by turning the screw 25 to move the plate 24 towards or away from the capacitor fixed plates, which consist of a brass block 26 secured to the brass side plate 2 of the box shaped enclosure and a brass plate 27 secured to the insulating supporting block 19. The moving plate 24 is permanently connected electrically to the metal base plate 21 by a flexible lead 28. Also mounted on the base plate 21 are trimmer capacitors 29 and 30, a fixed resistor 31 and a co-axial connector 32 into which a flexible co-axial lead may be plugged. One terminal of the fixed resistor 31 is connected to the metal base plate 21 and the other terminal is connected to a copper busbar 33 carried between the insulating supports 19 and 20. The busbar 33 is electrically connected by a screw 34 to the fixed capacitor plate 27 and by a lead 35 to the terminal 7.

The terminals of the co-axial connector 32 constitute the two terminals of the arrangement, the outer terminal is electrically connected to the metal base plate 21 and the central terminal is conneced by a lead 36 to the brass side plate 2 and also to the fixed plates of the trimmer capacitor 29. The moving plates of the trimmer capacitor 29 are connected to the metal base plate 21. The trimmer capacitor 30 is connected between the busbar 33 and the metal plate 21.

The electrical connections between the various elements can more clearly be seen from Figure 4 in which the same references are used as in Figures 1 to 3. Referring to Figure 4, diagram (*a*) shows all of the circuit elements diagrammatically with their electrical connections and diagram (*b*) is a simplified circuit diagram. In diagram (*b*) the capacitance $C_1$ referred to in the introduction to the specification is constituted by the trimmer capacitor 29 and the plates 24 and 26, the capacitance $C_2$ by the trimmer capacitor 30 and the plates 24 and 27, the resistance R by the resistor 31 and inductance L by the inductance of the variable resistor (1, 9) and its lead, which in the arrangement described includes a coil 35. The dotted line in diagram (*a*) indicates a mechanical coupling.

It will be seen that by rotation of the thumb wheel 14 the resistance of the variable resistor and hence also its inductance can be varied while simultaneously the capacitance of the two variable capacitors is made to vary linearly and in the same sense. The setting of the slide is indicated by a pointer 37 mounted on the insulating block 22 and registering with a scale 38 carried on the brass side plate 3 of the box like enclosure for the slide.

The arrangement is set by connecting it by means of a co-axial lead plugged into the co-axial connector 32 to a high frequency impedance bridge, setting the variable resistor to mid-scale by rotation of the thumb wheel 14 and, with the impedance bridge set to the required resistance and reactance, adjusting the trimmer capacitors 29 and 30 to balance the bridge. In the application for which the arrangement was designed the setting will normally be such that the reactance of the arrangement remains at zero. If necessary the common plate 24 for the two variable capacitors is adjusted by rotation of the screw 25 until for all adjustments of the slide indicated on the scale 38 the arrangement has the required reactance as indicated by the H. F. impedance bridge.

When the arrangement is set to act as a pure resistance with no reactance the correct adjustment of the trimmer capacitors 29 and 30 may make the total capacitance connected across input terminals ($C_1$) slightly different from the total capacitance connected across the fixed resistor 31 ($C_2$), for example these values may differ by rather more than 1%.

The whole device should preferably be enclosed by a screen (e. g. a box) of which the metal base plate 21 may form a part. The screen will usually, but not necessarily, be earthed.

An example of suitable values for the various elements in the arrangements shown in Figures 1–3 is

| | |
|---|---|
| $C_1$ and $C_2$ | Each about $10\times10^{-12}$ farads. |
| R | 75 ohms. |
| L | $120\times10^{-9}$ henries. |

and resistance of the variable resistor 2 ohms.

What we claim as our invention is:

1. A two terminal variable impedance network which behaves substantially as a pure resistance throughout its range of adjustment comprising two terminals, a fixed non-inductive resistor and a variable inductive resistor electrically connected in series between the two terminals, a variable capacitor connected across the two terminals, a variable capacitor connected across the fixed resistor, adjusting means for each of the capacitors and a mechanical coupling between both said adjusting means and the variable resistor, the values of the elements being so chosen and the mechanical coupling being so constructed that for all adjustments $$\sqrt{\frac{L}{2C}}$$

is substantially equal to the resistance (R) of the fixed non-inductive resistor, L being the value of the inductance of the variable resistor and C being the value of the capacitance of each of the two capacitors, R being much greater than the maximum values of the reactive and resistive components of the variable resistor.

2. A two terminal variable impedance network which behaves substantially as a pure resistance throughout its range of adjustment comprising two terminals, a fixed non-inductive resistor and a variable inductive resistor electrically connected in series between the two terminals, a variable capacitor connected across the two terminals, a variable capacitor connected across the fixed resistor, adjusting means for each of the capacitors and a mechanical coupling between both said adjusting means and the variable resistor, the values of the elements being so chosen and the mechanical coupling being so constructed that for all adjustments $$\sqrt{\frac{L}{C_1+C_2}}$$

is substantially equal to the resistance (R) of the fixed non-inductive resistor, L being the value of the inductance of the variable resistor, and $C_1$ and $C_2$, which are nearly equal, being the values of the capacitance of the two capacitors, R being much greater than the maximum values of the reactive and resistive components of the variable resistor.

3. A two-terminal variable impedance network comprising a variable inductive resistor and a fixed non-inductive resistor, having a resistance value many times greater than said variable resistor, electrically connected in series between the two terminals, a variable capacitor connected across the two terminals, a variable capacitor connected across the fixed resistor and adjusting means for the variable inductive resistor and for each of the capacitors all mechanically coupled for simultaneous and related movements.

4. A two-terminal variable impedance network comprising a variable inductive resistor, in the form of a slide and a straight resistance element along which a moving contact carried on the slide moves, and a fixed non-inductive resistor, having a resistance value many times greater than said variable resistor, electrically connected in series between the two terminals, a variable capacitor connected across the two terminals, a variable capacitor connected across the fixed resistor, adjusting means for each of the capacitors and a mechanical coupling between the slide and the adjusting means for the two capacitors which effects adjustment of the value of the capacitors simultaneously with the adjustment of the value of the resistance and its associated inductance.

5. A two-terminal variable impedance network comprising a variable inductive resistor, in the form of a slide and a straight resistance element along which a moving contact carried on the slide moves, and a fixed non-inductive resistor, having a resistance value many times greater than said variable resistor, electrically connected in series between the two terminals, two variable capacitors constituted by two fixed metal plates insulated from each other and forming one electrode of each capacitor, one electrically connected to the slide and the other to the operative fixed terminal of the variable resistor and a third common metal plate cooperating with the two fixed plates, an electrical connection between the third plate and the terminal to which the fixed resistor is connected and a mechanical coupling between the slide and the third plate which adjusts the value of the capacitors as the slide moves to adjust the value of the resistance and its associated inductance.

6. A two-terminal variable impedance network comprising first and second terminals, a straight resistance element mounted in a support, a slide electrically connected to the first terminal and movable along the support, a contact carried by the slide and bearing on the resistance element throughout the movement of the slide, a fixed non-inductive resistor, having a resistance value many times greater than said variable resistor, connected between one end of the resistance element and the second terminal, a capacitor moving electrode carried by the slide and electrically connected to the second terminal, a fixed capacitor electrode mounted on the support, cooperating with but insulated from the moving electrode and electrically connected with the slide, and a second fixed capacitor electrode mounted on the support, cooperating with but insulated from the moving electrode and electrically connected to the terminal of the fixed resistor to which the resistance element is connected.

7. A two-terminal variable impedance network comprising first and second terminals, a straight resistance element mounted in a support, a slide electrically connected to the first terminal and movable along the support, a contact carried by the slide and bearing on the resistance element throughout the movement of the slide, a fixed non-inductive resistor, having a resistance value many times greater than said variable resistor, connected between one end of the resistance element and the second terminal, a capacitor moving electrode carried by the slide and electrically connected to the second terminal, a fixed capacitor electrode mounted on the support, cooperating with but insulated from the moving electrode and electrically connected to the slide, a second fixed capacitor electrode mounted on the support, cooperating with but insulated from the moving electrode and electrically connected to the terminal of the fixed resistor to which the resistance element is connected, and two independently adjustable trimmer capacitors one connected across the two terminals and one connected across the fixed non-inductive resistor.

References Cited in the file of this patent

UNITED STATES PATENTS

| | | |
|---|---|---|
| 1,762,969 | Farrington | June 10, 1930 |
| 2,505,980 | Mautner | May 2, 1950 |

FOREIGN PATENTS

| | | |
|---|---|---|
| 908,194 | France | Aug. 20, 1945 |